US005401045A

United States Patent [19]

Foerster et al.

[11] Patent Number: 5,401,045

[45] Date of Patent: Mar. 28, 1995

[54] WHEELCHAIR WITH A BARRIER-FREE FOOTREST

[76] Inventors: Stephen R. Foerster, 1936 S. 98th St., West Allis, Wis. 53227; David M. Bobke, 18240 W. Michaels Rd., New Berlin, Wis. 53146

[21] Appl. No.: 154,701

[22] Filed: Nov. 18, 1993

[51] Int. Cl.[6] .................... B62K 15/00

[52] U.S. Cl. .................... 280/250.1; 280/304.1; 297/423.37; 297/466

[58] Field of Search .................... 280/250.1, 304.1; 180/907; 297/423.37, 466

[56] References Cited

U.S. PATENT DOCUMENTS

| | | | |
|---|---|---|---|
| 3,398,974 | 8/1968 | Edwards et al. | 280/289 |
| 3,937,490 | 2/1976 | Nasr | 280/242 |
| 4,176,879 | 12/1979 | Rodaway | 297/429 |
| 4,199,036 | 4/1980 | Wereb | 180/6.5 |
| 4,523,769 | 7/1985 | Glaser et al. | 280/250.1 X |
| 4,617,919 | 10/1986 | Suhre | 128/78 |
| 4,768,797 | 9/1988 | Friedrich | 280/250.1 |
| 4,893,827 | 1/1990 | Gay et al. | 280/250.1 |
| 4,951,766 | 8/1990 | Basedow et al. | 180/6.5 |
| 4,981,305 | 1/1991 | Lockard et al. | 280/250.1 |
| 4,988,114 | 1/1991 | Thornton, Jr. et al. | 280/304.1 |
| 4,989,890 | 2/1991 | Lockhard et al. | 280/42 |
| 5,209,509 | 5/1993 | Gay et al. | 280/304.1 |

FOREIGN PATENT DOCUMENTS

| | | | |
|---|---|---|---|
| 1115768 | 4/1956 | France | 297/466 |
| 92/08432 | 5/1992 | WIPO . | |

OTHER PUBLICATIONS

The Toronto Star, Photo, Jul. 11, 1989.
Motion Designs Sunrise Medical Information Brochure–"ZIPPIE", Dec., 1988.
Avenues Unlimited Sales Catalog–Spring 1993.

*Primary Examiner*—Mitchell J. Hill
*Assistant Examiner*—Victor E. Johnson
*Attorney, Agent, or Firm*—Michael Best & Friedrich

[57] ABSTRACT

A wheelchair including a first front wheel, a second front wheel, and a wheelchair frame having a front portion and being supported by the wheels such that the first wheel rotates about a first, generally vertical axis, the second front wheel rotates about a second, generally vertical axis, and the first and second axes are in a vertical plane adjacent the front portion. The wheelchair also includes a footrest having a first generally vertical support member connected to the frame so that the vertical support member is substantially in the plane, a second support member connected to the first support member so that the second support member extends generally in the plane and from the first support member in a direction transverse to vertical and transverse to horizontal, and so that the second support member has an end spaced from the first support member. The wheelchair also includes a generally horizontal foot support connected to the end of the second support member and a retaining strap connected to the footrest to secure a user's foot to the foot support.

19 Claims, 3 Drawing Sheets

WHEELCHAIR WITH A BARRIER-FREE FOOTREST

BACKGROUND OF THE INVENTION

The invention relates to wheelchairs, and particularly, to a footrest for a wheelchair.

It is known in the art to provide a pair of footrests or a foot support for a wheelchair. Known constructions for wheelchair footrests typically position the feet substantially out in front of the wheelchair frame and front wheels. This construction places the user of the wheelchair in a posture in which it is difficult to reach out in front of the wheelchair to engage in simple daily tasks such as cooking, handwashing etc.

Such a construction also limits the maneuverability of the wheelchair. Specifically, the footrests extending out in front of the wheelchair create a barrier which prevents the user of the wheelchair from closely approaching counters, stoves, and other structures and which reduces the ability of the wheelchair user to turn the wheelchair in relatively enclosed areas.

At least one wheelchair, which is specifically designed for children and which is shown in U.S. Pat. No. 4,989,890, discloses a pair of footrests that do not extend outwardly in front of the wheelchair. However, such a footrest is not suitable for use by an adult wheelchair user because the additional length of the adult's legs would require that the footrests extend below the seat to a level at which they would interrupt with the normal 360° rotation of the front wheels or casters of the wheelchair.

SUMMARY OF THE INVENTION

Thus, it is an advantage to provide, on an adult wheelchair, a pair of footrests that do not extend outwardly in front of the wheelchair and that position the lower legs (from the ankle to the knee) of the wheelchair user in a generally vertical position to allow the user to maneuver closer to obstacles.

Accordingly, the invention provides a wheelchair including a pair of front wheels, and at least one rear wheel. The wheelchair includes a frame having a front portion. The frame is supported by the wheels such that the first wheel rotates about a first generally vertical axis and so that the second wheel rotates about a second generally vertical axis. The vertical axes define a generally vertical plane adjacent the front portion of the wheelchair frame.

The invention also provides a footrest for the wheelchair. The footrest includes a first generally vertical support member that is removably connected to the wheelchair frame. The vertical support member is substantially in the vertical plane defined by the axes. The wheelchair footrest also includes a second support member connected to the first support member. The second support member extends generally in the vertical plane and downwardly and inwardly from the first support member and includes an end spaced from the first support member. A generally horizontal support member is connected to the end of the second support member. The horizontal support member includes an upper surface which is adapted to support the foot of a wheelchair user.

The wheelchair of the invention is an improvement over known constructions in that the footrest supports the lower leg (i.e., the calf portion, from the ankle to the knee) in a generally vertical position directly adjacent the front portion of the wheelchair. In this position, the footrests and legs do not present a barrier to a close frontal approach of the wheelchair to various structures. Additionally, supporting the user's legs in such a position places the user in a posture that allows for greater upper body range of motion and maneuverability.

The invention also provides a retaining strap for securing the foot of a wheelchair user to the upper surface of the support member. The retaining strap includes a first end having connected thereto a collar and a second end having connected thereto a ring. The second end is threaded through the collar to form a loose loop in the retaining strap to receive the wheelchair user's foot. The ring is easily engageable by a cane or other implement to allow the user to tighten the loop around her/his foot, thereby securing her/his foot to the footrest. A fastener is provided on the retaining strap to secure the second end of the retaining strap and secure the wheelchair user's foot on the upper surface.

A principal advantage of the invention is the provision of a barrier-free footrest for a wheelchair.

Another advantage of the invention is the provision of a footrest that is vertically adjustable to accommodate different user leg lengths.

Another advantage of the invention is the provision of a barrier-free footrest that is removable from the wheelchair.

Another advantage of the invention is the provision of a barrier-free footrest capable of pivoting away from the front of the wheelchair so as not to inhibit the movement of the user as the user maneuvers into or out of the wheelchair.

Other features and advantages of the invention will become apparent to those skilled in the art upon review of the following detailed description, claims, and drawings.

Figure 1:
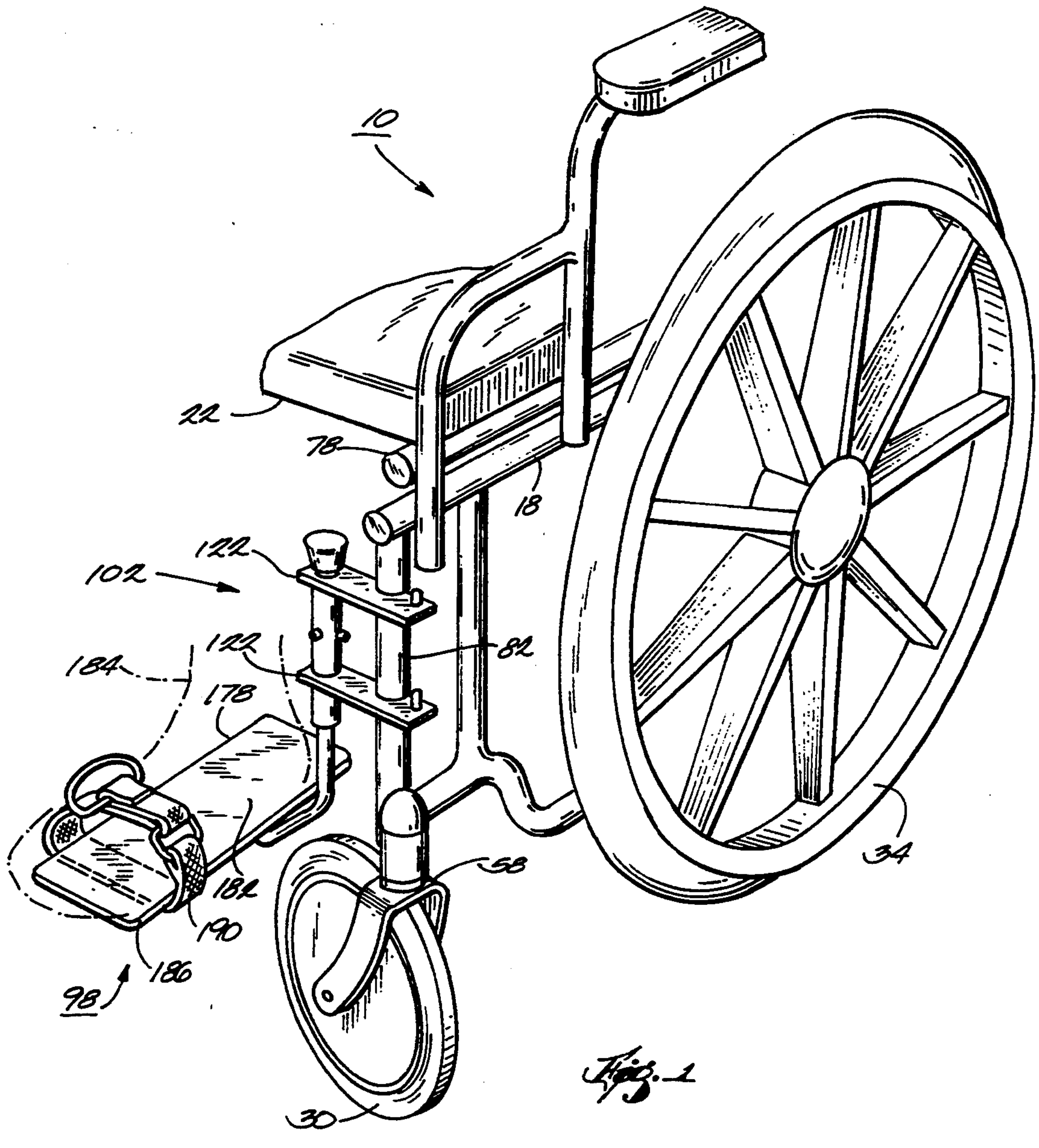
FIG. 1 is a partial perspective view of a wheelchair embodying the invention, showing the front portion and the left footrest of the wheelchair.

Before one embodiment of the invention is explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DETAILED DESCRIPTION OF THE PREFERRED EMBODIMENT

Figure 2:
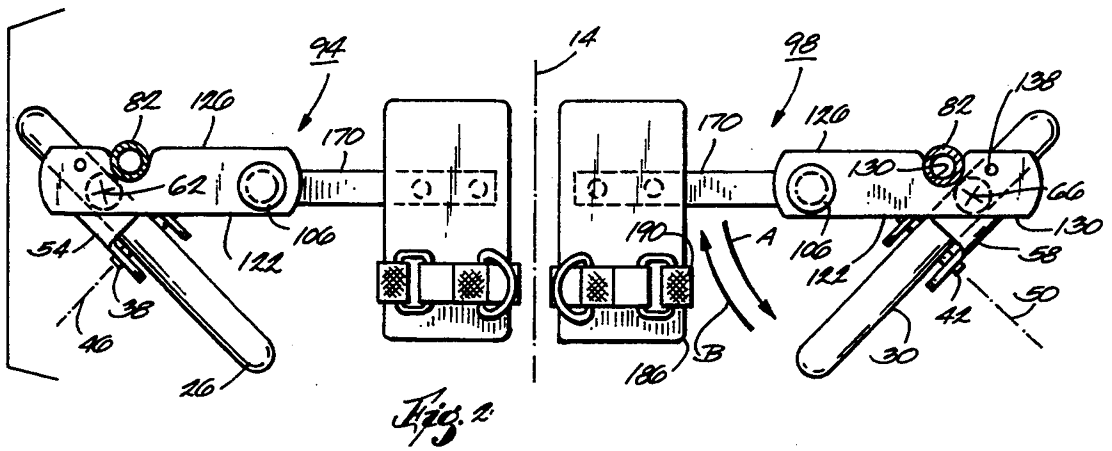
FIG. 2 is a top plan view of the front portion of the wheelchair showing both left and right footrests.

Shown in FIG. 1 of the drawings is a wheelchair 10 embodying the invention. As is known in the art, the wheelchair 10 is generally symmetrical about an axis 14 (FIG. 2) and includes a frame 18 for supporting a generally horizontal seat 22. The seat 22 is adapted to support a wheelchair user (not shown). A pair of front wheels or casters 26 and 30 (both are shown only in FIG. 2) and a pair of rear wheels 34 (only one of which is shown in FIG. 1) are connected to the frame 18 to support the frame 18 on a surface (not shown) for movement along the surface.

As is known in the art, the front wheels 26 and 30 include (see FIG. 2) respective axles, 38 and 42. The axles, 38 and 42 have respective axes 46 and 50. The wheels 26 and 30 rotate around the axes 46 and 50, respectively, as the wheelchair 10 moves along the surface (not shown). The front wheels 26 and 30 also include respective pivot assemblies, 54 and 58. As is known in the art, the pivot assemblies 54 and 58 allow free 360° rotation of the wheels 26 and 30 about generally vertical axes 62 and 66, respectively. As the wheels 26 and 30 rotate about the axes 62 and 66, the wheels 26 and 30 define a rotational pathway 70 which is shown partially in phantom in FIG. 3 and which includes an upper border 74.

The wheelchair frame 18 includes a front portion 78 adjacent the front wheels 26 and 30. The front portion 78 of the frame 18 includes a generally vertical frame member 82 (FIG. 2) on each side of the axis 14. Each frame member 82 includes (see FIG. 3) two generally parallel projections 86 that are connected to the frame member 82 and that extend horizontally outwardly or away from the axis of symmetry 14. A mounting pin 90 is connected to each projection 86. The mounting pins 90 extend vertically along a common axis 92. The purpose of the projections 86 and the mounting pins 90 will be discussed in greater detail below.

The wheelchair 10 also includes (see FIG. 2) a pair of footrests 94 and 98 mounted on the wheelchair frame 18. One footrest is mounted on each of the frame members 82. The footrests 94 and 98 are mounted (in a manner described below) for pivotal movement about the axes 92 between a first or use position (FIG. 2), in which the user's feet may be supported by the footrests, and a second or non-use position (not shown), in which the footrests extend in opposite directions away from the axis of symmetry 14. The footrests 94 and 98 are mirror images of one another. Accordingly, only the left footrest 98 will be described in detail.

Figure 3:
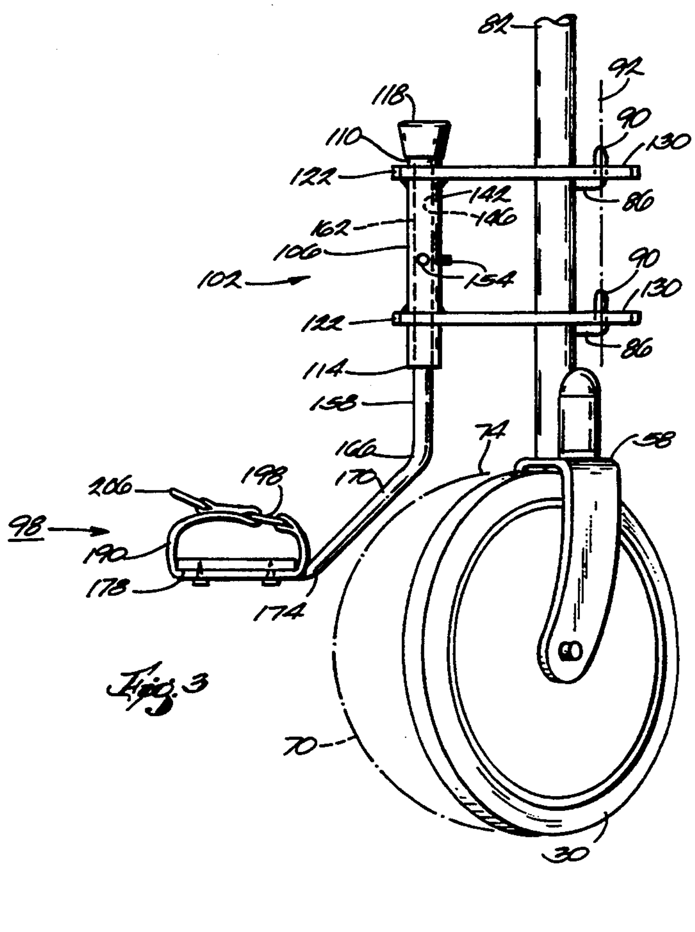
FIG. 3 is a partial front elevational view of the wheelchair showing the left footrest.
Figure 4:
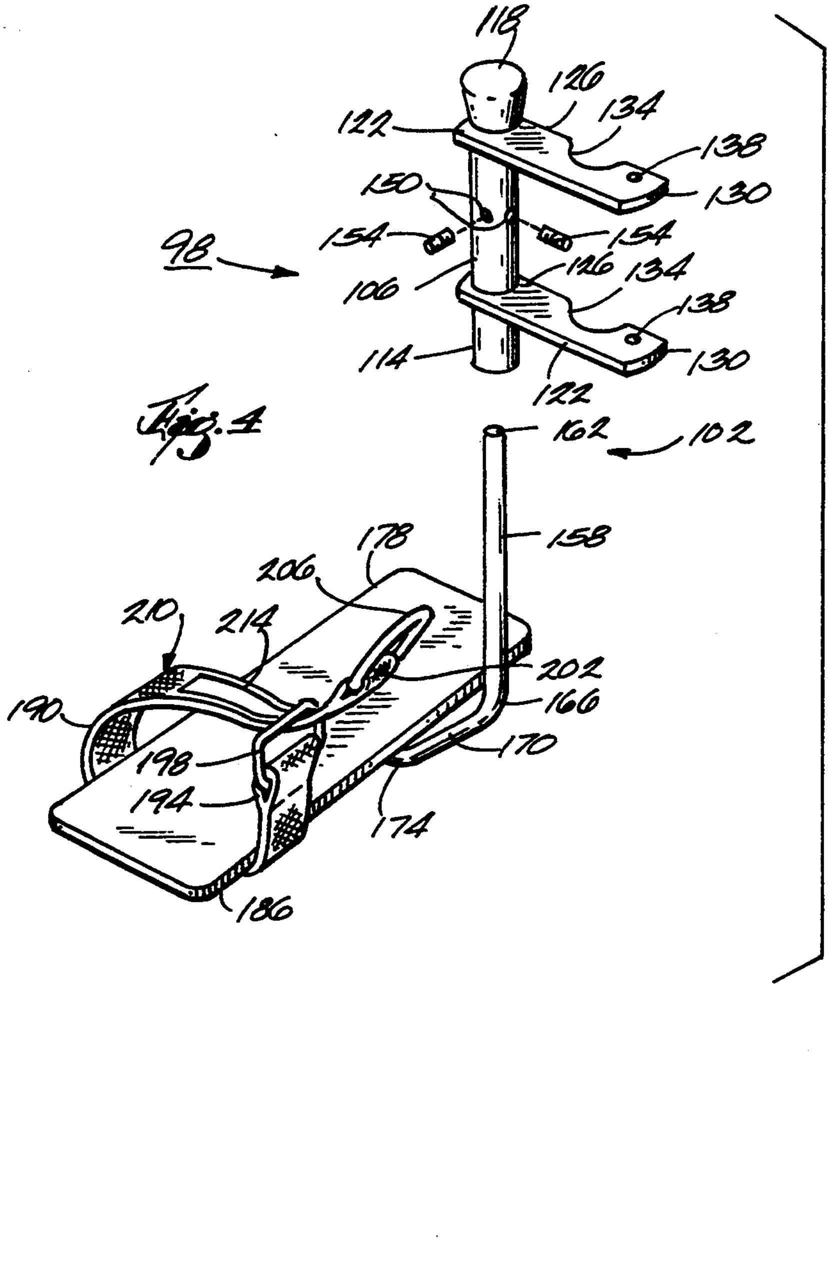
FIG. 4 is an exploded perspective view of the left footrest.

As best shown in FIGS. 3 and 4, the footrest 98 includes a first, generally vertical support member 102 connected to the frame member 82. The support member 102 includes a first portion 106 having an upper end 110 (FIG. 3 only) and a lower end 114. The upper end 110 has thereon a protective rubber safety cap 118. A pair of generally horizontal support brackets 122 are welded to the first portion 106. As shown in FIG. 3, the support brackets 122 are generally parallel to one another and each bracket has a rearward surface 126 (FIG. 4) and an end 130 spaced from the first portion 106. The rearward surface 126 has an arcuate portion 134 (best shown in FIG. 4) which engages the frame member 82 (FIG. 2) when the footrest 98 is in the use position. The support brackets 122 also each have therein (see FIG. 4) a through-bore 138 adjacent the end 130. Through-bores 138 receive respective mounting pins 90 to removably and pivotally connect the first portion 106 of the support member 102 to the wheelchair frame 18. In this position, the first portion 106 is pivotable between the use and non-use positions about the axis 92.

The first portion 106 is a generally hollow conduit and has an outer surface 142 and an inner passageway 146 (FIG. 3). A pair of threaded through-bores 150 (FIG. 4) extend between the outer surface and the passageway. A set screw 154 is threaded into each of the through-bores 150 to allow adjustment of the footrest 98 in a manner to be described below in greater detail.

The support member 102 also includes (see FIGS. 3 and 4) a second portion 158 connected to the first portion 106. The second portion 158 has opposite upper and lower ends 162 and 166 and is preferably a generally solid rod. The end 162 extends through the lower end 114 of the first portion 106 and into the passageway 146. The second portion 158 is telescopically and slidably adjustable in the passageway 146 relative to the first portion 106. The second portion 158 is secured in the desired vertical position relative to the first portion 106 by adjustment of the set screws 154 so that the set screws engage the second portion 158.

The footrest 98 also includes a second support member 170 connected to the lower end 166 of the second portion 158 so that the second support member 170 extends generally downwardly and inwardly in the vertical plane defined by the axes 62 and 66, i.e., in a direction transverse to vertical and transverse to horizontal and toward the axis of symmetry 14. The second portion 158 and the second support member 170 are preferably formed from a solid piece of material that is appropriately bent during the manufacturing process to form the desired shape. Alternatively, the second support member 170 may be welded to the end 166 of the second portion 158. The second support member 170 includes an end 174 spaced from the end 166 of the second portion 158.

The footrest 98 also includes a generally horizontal platform 178 connected to the end 174 of the second support member 170. The platform 178 includes an upper surface 182 for supporting the foot 184 (shown in phantom in FIG. 1) of the wheelchair user. The second support member 170 and the platform 178 extend below the upper border 74 of the wheel pathway 70. However, because the second support member 170 and the platform 178 extend inwardly at an angle toward the axis of symmetry 14, the second support member 170 and platform 178 do not interfere with the wheel pathway 70, and accordingly, the footrests 94 and 98 allow free 360° rotation of the front wheels 26 and 30.

The platform 178 includes a front portion 186 (FIGS. 1, 2 and 4) and a retaining strap 190 mounted on the front portion 186 to secure the wheelchair user's foot 184 (FIG. 1) to the upper surface 182 of the platform 178. As shown in FIG. 4, the strap 190 includes a first end 194 and a collar 198 connected to the first end 194. The retaining strap 190 also includes a second end 202 extending through the collar 198. An engaging ring 206 is connected to the second end 202 and is easily grasped by the hands of the wheelchair user or, alternatively, by a cane or other implement (not shown) controlled by the user. The strap 190 includes, adjacent the second end 202, a fastener 214. The fastener 214 allows the user to fasten the second end 202 of the retaining strap 190 and secure the user's foot 184 on the upper surface 182. The fastener 214 is preferably a flexible fabric-type material which engages upon contact with itself or a similar fabric. The retaining strap 190 can be secured simply by engaging the ring 206 and looping the second end 202 of the retaining strap 190 over itself to bring one portion of the fastening fabric in contact with another portion of the fastening fabric.

In operation, the footrest 98 is connected to the mounting pins 90 on the frame members 82 and is adjusted, using the set screws 154, to accommodate the leg length of the wheelchair user. As shown in FIG. 3, the platform 178 of the footrest 98 can be lowered below the top of the wheel pathway without inhibiting the 360° rotation of the wheel. The footrest 98 is pivoted out of the plane about the axis and in the direction of the arrow A in FIG. 2 to allow the user to maneuver into the wheelchair 10. Once the user is seated, the footrests 94 and 98 are pivoted about the axis and in the direction of arrow B in FIG. 2 so that the first and second support members 102 and 170 of the footrests 94 and 98 are generally in the plane. In this position, the wheelchair 10 is essentially barrier-free, and the footrests 94 and 98 allow greater maneuverability of the wheelchair 10. The user's feet are placed on the upper surface 182 of the respective footrest platforms 178 and beneath the loose loop of the retaining strap 190. The user then engages the ring 206 to loop the second end 202 of the strap 190 over the collar 198 and engage the flexible fabric fastener 214 on the retaining strap 190. The wheelchair footrests 94 and 98 position the lower legs of the user in a generally vertical position (i.e., with the ankle directly below or, alternatively, below and slightly behind the knee) so that the wheelchair user is in a posture that allows greater physical, upper body flexibility and maneuverability while in the seated position.

When getting out of the wheelchair 10, the user unfastens the retaining straps 190 by engaging and pulling upwardly on the rings 206. The feet are then removed from the footrests. The footrests 94 and 98 are then pivoted in the direction of arrow A in FIG. 2 out of the plane so as not to inhibit the user's movement from the wheelchair 10.

Various features of the invention are set forth in the following claims.

What is claimed is:

1. A wheelchair comprising:

a first front wheel;

a second front wheel;

a wheelchair frame having a front portion and being supported by the wheels such that the first wheel rotates about a first, generally vertical axis, the second front wheel rotates about a second, generally vertical axis, and the first and second axes are in a generally vertical plane adjacent the front portion; and a footrest including a first generally vertical support member connected to the frame so that the vertical support member is substantially in the plane, a second support member connected to the first support member and including an end spaced from the first support member so that the second support member extends generally in the plane in a direction transverse to vertical and transverse to horizontal from the first support member to the end, and a generally horizontal foot support connected to the end of the second support member.

2. A wheelchair as set forth in claim 1 wherein the first support member includes a first portion and a second portion slidably connected to the first portion so that the second portion is telescopically adjustable relative to the first portion.

3. A wheelchair as set forth in claim 2 wherein the second support member is connected to the second portion so that movement of the second portion relative to the first portion causes movement of the foot support relative to the frame.

4. A wheelchair as set forth in claim 1 wherein the foot support has an upper surface and wherein the footrest includes a retaining strap connected to the support member, securing a wheelchair user's foot on the upper surface.

5. A wheelchair as set forth in claim 1 wherein the first support member includes a bracket for connecting the footrest to the wheelchair.

6. A wheelchair as set forth in claim 5 wherein the bracket includes first and second supports removably connected to the front portion of the wheelchair frame.

7. A wheelchair as set forth in claim 1 and including a seat adapted to position a wheelchair user such that the user faces in a generally forward direction and wherein the plane is generally perpendicular to the forward direction.

8. A wheelchair as set forth in claim 1 wherein the first generally vertical support member is spaced from the first and second axes.

9. A wheelchair comprising:

a first front wheel;

a second front wheel;

a wheelchair frame having a front portion and being supported by the wheels such that the first wheel rotates about a first, generally vertical axis, the second front wheel rotates about a second, generally vertical axis, and the first and second axes are in a generally vertical plane adjacent the front portion;

a removable footrest including a first generally vertical support member connected to the frame so that the vertical support member is substantially in the plane, is spaced from the axes, and includes a first portion and a second portion slidably connected to the first portion so that the second portion is telescopically adjustable relative to the first portion, a second support member connected to the second portion of the first support member so that the second support member extends generally in the plane and from the first support member in a direction transverse to vertical and transverse to horizontal, the second support member having an end spaced from the first support member, and a generally horizontal foot support connected to the end of the second support member so that adjustment of the second portion relative to the first portion causes movement of the foot support relative to the frame; and a retaining strap connected to the footrest to secure a user's foot on the footrest.

10. A wheelchair as set forth in claim 9 wherein the retaining strap includes a first end having mounted thereon a collar, and a second end having mounted thereon a ring, and wherein the strap extends around the foot support so that the second end passes through the collar to form a loop for receiving the wheelchair user's foot.

11. A wheelchair as set forth in claim 10 wherein the retaining strap includes a fastener for fastening the second end to the strap thereby securing the loop around the wheelchair user's foot and securing the wheelchair user's foot to the footrest, the ring being engageable by a user to allow independent fastening of the strap by the user.

12. A wheelchair as set forth in claim 9 wherein the first support member includes a bracket for connecting the footrest to the wheelchair.

13. A wheelchair as set forth in claim 12 wherein the bracket includes first and second supports removably connected to the front portion of the wheelchair frame.

14. A wheelchair as set forth in claim 9 and including a seat adapted to position the user such that the user faces in a generally forward direction and wherein the plane is generally perpendicular to the forward direction.

15. A wheelchair comprising:

a wheelchair frame having a front portion a footrest supported by the frame adjacent the front portion and including a generally horizontal foot support; and a retaining strap connected to the foot support to secure a user's foot to the foot support, and the retaining strap including a first end having mounted thereon a collar, and a second end having mounted thereon a ring, and wherein the strap extends around the foot support so that the second end passes through the collar to form a loop for receiving the wheelchair user's foot.

16. A wheelchair as set forth in claim 15 wherein the wheelchair further includes a first front wheel and a second front wheel and wherein the wheelchair frame is supported by the wheels such that the first wheel rotates about a first, generally vertical axis, the second front wheel rotates about a second, generally vertical axis, and the first and second axes are in a generally vertical plane adjacent the front portion.

17. A wheelchair as set forth in claim 16 wherein the footrest includes a first generally vertical support member removably connected to the frame so that the vertical support member is substantially in the plane and is spaced first and second from the axes, a second support member connected to the first support member so that the second support member extends generally in the plane and from the first support member in a direction transverse to vertical and transverse to horizontal, and so that the second support member has an end spaced from the first support member, and wherein the foot support is connected to the end of the second support member.

18. A wheelchair as set forth in claim 15 wherein the retaining strap is secured to the foot support and is adapted to extend around the wheelchair user's foot when the wheelchair user's foot is on the foot support.

19. A wheelchair as set forth in claim 15 wherein the retaining strap includes a fastener for fastening the second end to the strap to secure the loop around the wheelchair user's foot and securing the user's foot to the footrest, the ring being engageable by the user to allow independent fastening of the strap by the user.

* * * * *

UNITED STATES PATENT AND TRADEMARK OFFICE
CERTIFICATE OF CORRECTION

PATENT NO. : 5,401,045
DATED : March 28, 1995
INVENTOR(S) : Foerster et al.

It is certified that error appears in the above-identified patent and that said Letters Patent is hereby corrected as shown below:

Column 6, line 34, after "the" insert -- first and second --.

Signed and Sealed this

Eighteenth Day of July, 1995

Attest:

BRUCE LEHMAN

*Attesting Officer*

*Commissioner of Patents and Trademarks*